United States Patent [19]
Kawakami

[11] Patent Number: 5,897,229
[45] Date of Patent: Apr. 27, 1999

[54] CAMERA HAVING LENS MOUNT

[75] Inventor: Sohichiroh Kawakami, Tokyo, Japan

[73] Assignee: Asahi Kogaku Kogyo Kabushiki Kaisha, Tokyo, Japan

[21] Appl. No.: 09/010,931

[22] Filed: Jan. 22, 1998

[30]     Foreign Application Priority Data

Jan. 24, 1997 [JP] Japan .................................. 9-026121

[51] Int. Cl.⁶ ............................................ B03B 17/14
[52] U.S. Cl. ......................................... 396/301; 396/532
[58] Field of Search ................... 396/532, 529, 396/301

[56]          References Cited

U.S. PATENT DOCUMENTS

| | | | |
|---|---|---|---|
| 4,860,043 | 8/1989 | Kurei et al | 396/523 |
| 4,939,532 | 7/1990 | Takehayashi | 396/523 |
| 5,012,264 | 4/1991 | Nagano et al. | 396/523 |
| 5,664,245 | 9/1997 | Kurihara et al. | 396/532 |

FOREIGN PATENT DOCUMENTS

62-267732  11/1987  Japan .

*Primary Examiner*—W. B. Perkey
*Attorney, Agent, or Firm*—Greenblum & Bernstein P.L.C.

[57]          ABSTRACT

A camera has a lens mount for mounting an interchangeable lens unit. The camera further includes a casing, a chassis provided in the interior of the casing, a button provided to the casing, a lock mechanism (actuated in response to the button) which locks the lens unit in a state the lens unit is mounted on the lens mount, a sensor unit which detects whether the lock mechanism locks the lens unit or not. The sensor unit is disposed in a space provided to the chassis. The camera is provided with an actuator moved in response to the lock mechanism, which penetrates a panel of the chassis so that the actuator can actuate the sensor unit.

19 Claims, 8 Drawing Sheets

CAMERA HAVING LENS MOUNT

BACKGROUND OF THE INVENTION

The present invention relates to a camera having a lens mount for mounting an interchangeable lens unit.

Generally, a camera (for example, a single reflex lens camera) has a lens mount for mounting an interchangeable lens unit. The lens mount and the lens unit respectively include a mount ring and a joint ring, which are mating with each other.

In order to transmit auto-exposure (AE) signals and auto-focus (AF) signals between the lens unit and a controller provided in a body of the camera, the mount ring is provided with several connector pins, while the joint ring is provided with several receptacles which receive the connector pins. The connector pins are arranged in a circumference (on the mounting ring) with certain intervals. When the lens unit is mounted to the lens mount, the connector pins and receptacles are electrically connected.

Recently, a driving motor (for example, a focusing motor or a zooming motor) is provided to the lens unit. Thus, it is necessary to provide additional connector pins and receptacles used for supplying power to the lens unit.

In order to minimize a space for the connector pins, it is preferred to arrange the connector pins for signal transmission and the connector pins for power supply on a same circumference. However, when a user rotates the lens unit to remove the lens unit from the lens mount, there is a possibility that the connector pins for power supply is unintentionally contact with the receptacles for signal transmission. In such case, power is unintentionally supplied to a circuit in the lens unit (via receptacles for signal transmission), which may damage the circuit.

In order to solve this problem, a recently developed camera is arranged to turn off the power supply when the lens unit is not mounted. In order to detect whether the lens unit is mounted to the lens mount or not, such camera has a sensor provided to a so-called lock-release-button. The button is arranged to release the lock of a lock mechanism (which locks the lens unit mounted to the lens mount) and is pressed while the user removes the lens unit from the lens mount.

However, since the button is generally provided to a front wall of a casing of the camera, the sensor is also located behind the front wall of the casing. Accordingly, if water penetrates into the casing of the camera (through a gap around the button), the sensor may get wet. Thus, there is a possibility that electric parts of the sensor get rusty, causing a faulty continuity.

SUMMARY OF THE INVENTION

It is therefore an object of the present invention to provided a camera having a lens mount, capable of preventing a sensor from getting wet to cause a faulty continuity.

According to one aspect of the present invention, there is provided a camera having a lens mount for mounting an interchangeable lens unit. The camera includes a casing, a chassis provided in the interior of the casings a button provided to the casing, a lock mechanism (actuated by the button) which locks the lens unit in a state the lens unit is mounted on the lens mount, a sensor unit which detects whether the lock mechanism locks the lens unit. The sensor unit is disposed in a space provided to the chassis. The camera is further provided with an actuator moved in response to the movement of the lock mechanism. The actuator penetrates a panel of the chassis so that the actuator can actuate the sensor unit.

Since the sensor unit is disposed in the space provided to the chassis, if water penetrates into the casing of the camera (through a gap around the button), it is prevented that the sensor unit get wet. Thus, it is prevented that electric parts of the sensor unit get rusty to cause a faulty continuity.

Particularly, the panel of the chassis is located between the sensor unit and the button. The casing includes a front wall on which the button is provided, the front wall and the panel are in parallel with each other.

It is preferred that the lock mechanism is actuated by the actuator. With this, the number of parts are decreased since the lock mechanism and the sensor unit are actuated by the same actuator.

In a particular arrangement, the camera includes a controller, first connector pins provided to the lens mount for transmitting signal between the controller and the lens unit, and second connector pins provided to the lens mount for supplying power to the lens unit. Further, the controller turns off a power supply to the second connector pins when the sensor unit detects that the lock mechanism releases (unlocks) the lens unit. Thus, if the second connector pins unintentionally contact with receptacles of the lens unit for transmitting signals while the user is removing the lens unit, there is no possibility that power is unintentionally supplied to a circuit in the lens unit 20 (via the receptacles) and damage the circuit.

Further, the sensor unit includes a support member and a slider supported by the support member. The slider is movable with respect to the support member, following the movement of the button. Optionally, the support member and the slider constitute an electrical switch, which is switched by the movement of the slider with respect to the support member. In particular, the support member is provided with a board with two terminals and the slider is provided with a contact member. The two terminals are electrically connected with each other via the contact member, when the contact member moves in contact with the two terminals.

Conveniently, the lock mechanism includes a swingable lever. The swingable lever engages the lens unit when the swingable lever swung in a first direction, and the swingable lever moves away from the lens unit when the swingable lever swung in a second direction. In this case, it is possible that the actuator further includes an urging member, wherein the urging member urges the swingable lever in the second direction when the button is pressed.

DESCRIPTION OF THE PREFERRED EMBODIMENT

The embodiment of the present invention is described with reference to the drawings.

Figure 1:
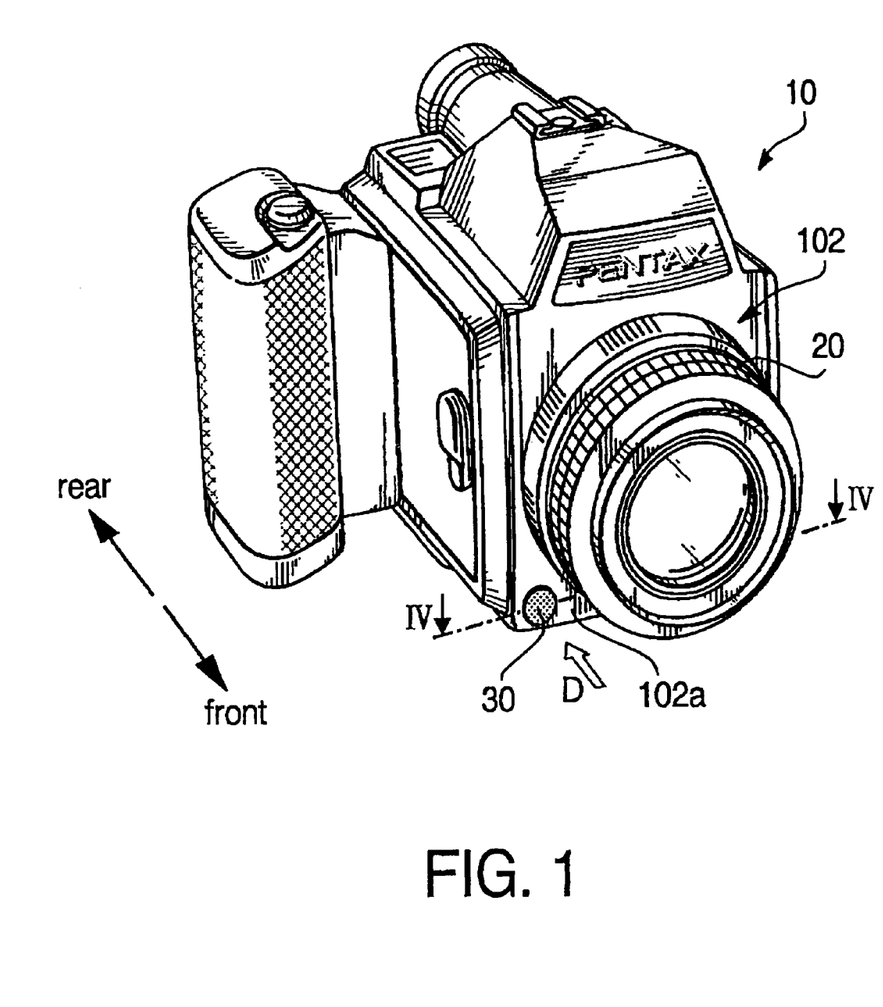
FIG. 1 is a perspective view of a camera of an embodiment of the present invention.

FIG. 1 is a perspective view of a camera 10 of the embodiment. The camera 10 is a single lens reflex camera using a roll film of 60 mm width (a brownie film), what is called a middle-sized SLR camera. The camera 10 has a box-shaped casing 102. An interchangeable lens unit 20 is mounted to the front side of the camera 10. Hereinafter, an lens unit side of the camera 10 is referred to as 'front', while the other side of the camera 10 is referred to as 'rear'.

Figure 2:
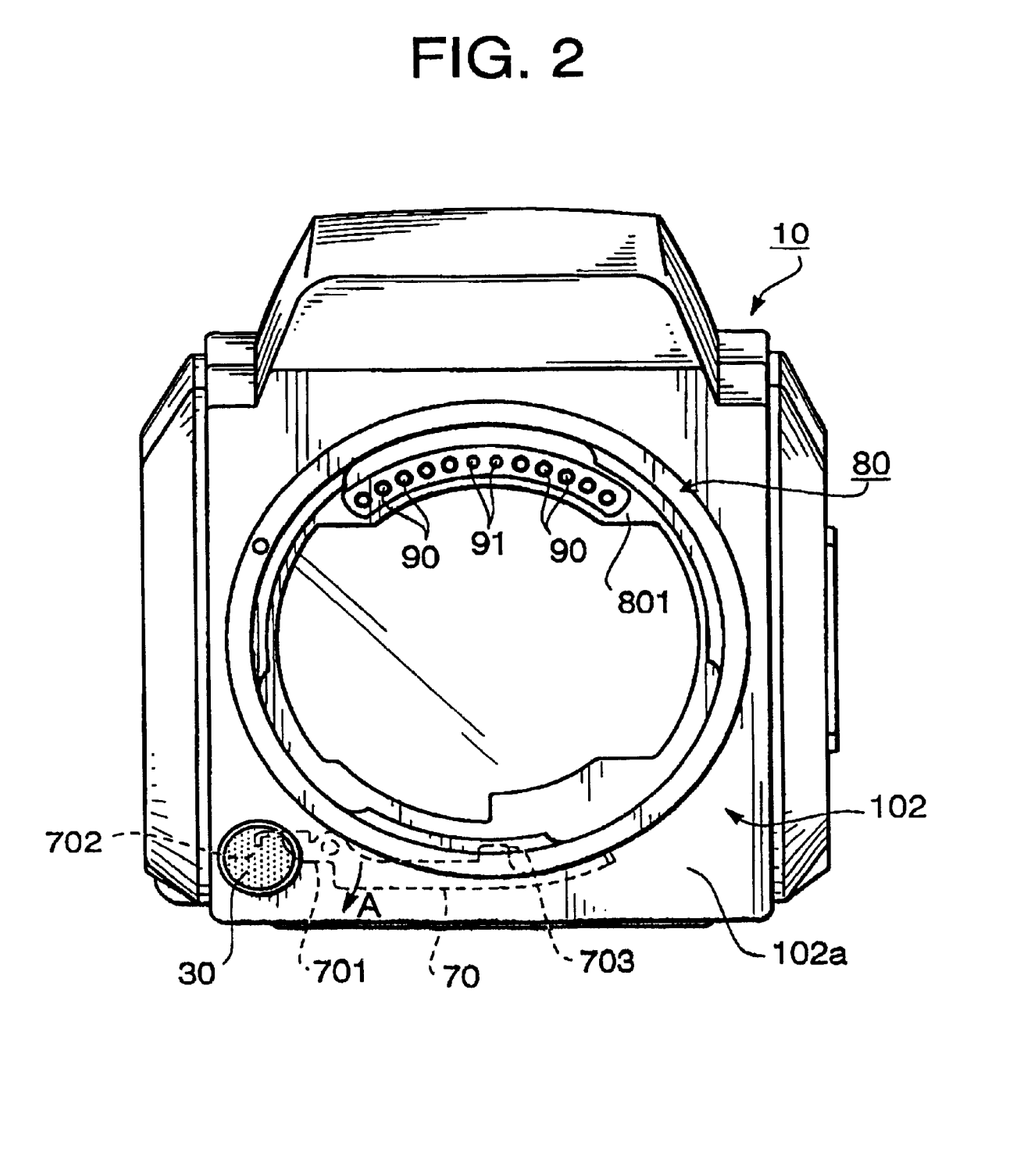
FIG. 2 is a front view of the camera of FIG. 1, with an interchangeable lens unit removed.

FIG. 2 is a front view of the camera 10, with the interchangeable lens unit removed. A lens mount 80 for mounting the lens unit 20 (FIG. 1) includes a mount ring 801. In order to transmit auto-exposure (AE) signals and auto-focus (AF) signals between a not shown circuit accommodated in the lens unit 20 (FIG. 1) and a controller 54 (FIG. 4) of the camera 10, the mount ring 801 is provided with ten connector pins 90. In order to supply power to a not shown motor (for example, a focusing motor) provided in the lens unit 20, the mount ring 801 is further provided with two connector pins 91. The connector pins 90 and 91 are received by not shown receptacles provided at the rear side of the lens unit 20 (FIG. 1). The connector pins 90 and 91 are arranged on a same circumference with certain intervals. When the lens unit 20 is mounted to the lens mount 80, the connector pins 90 and 91 of the mount ring 801 and not shown receptacles of the lens unit 20 are electrically connected with each other.

In order to lock the lens unit 20 (FIG. 1) in a state that the lens unit 20 is mounted to the lens mount 80, a swingable lock lever 70 is provided in the interior of the casing 102. When the lens unit 20 is mounted to the lens mount 80, an engaging member 703 of the lock lever 70 engages a portion of the lens unit 20 and locks the lens unit 20. For releasing the lock lever 70, a button 30 is provided to the front side of the casing 10. The button 30 is protruded from the front surface of the casing 102 so that the user can easily press the button 30. When the button 30 is pressed, the lock lever 70 is swung clockwise (as shown by A) so that the engaging member 703 is moved downward away from the lens unit 20, enabling the user to removed the lens unit 20.

Figure 3:
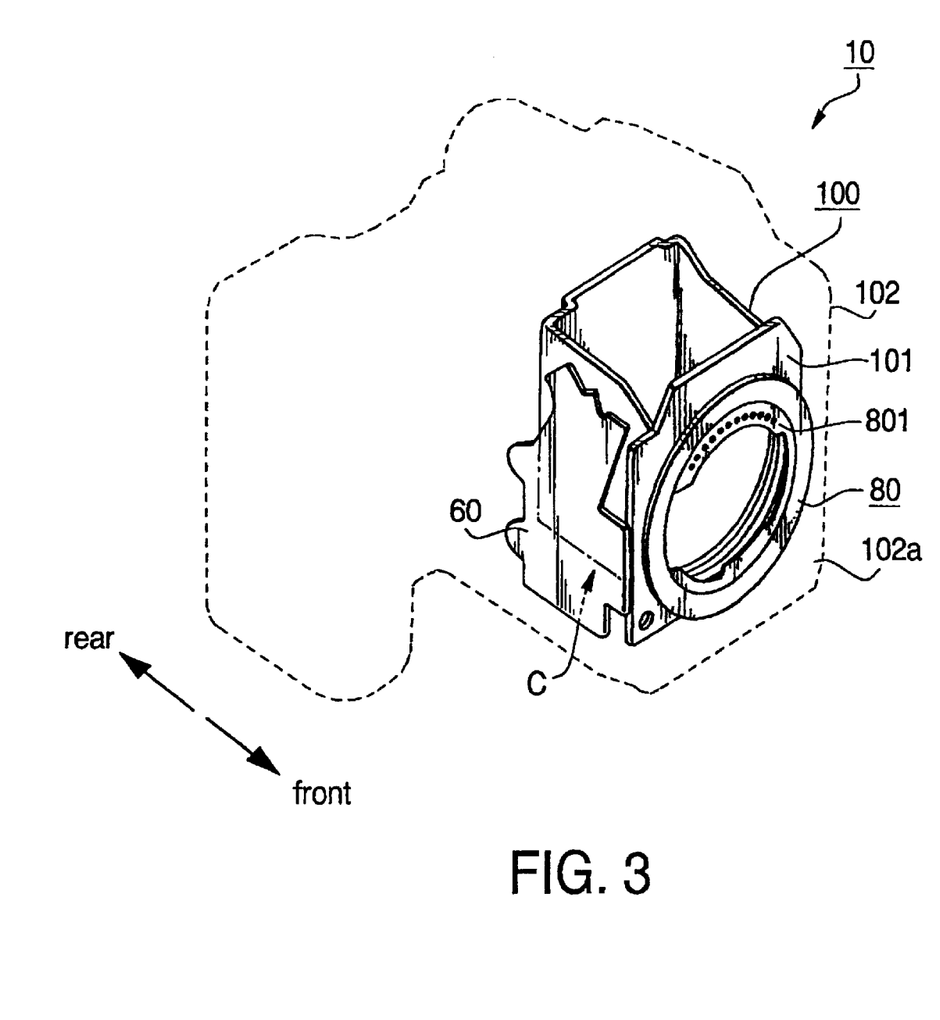
FIG. 3 is a perspective view showing a chassis of the camera of FIG. 1.

FIG. 3 is a perspective view showing a chassis 100 of the camera 10. The chassis 100 (made of an aluminum alloy) is provided in the interior of the casing 102 shown by a dashed line in FIG. 3. The chassis 100 has a front panel 101 facing a front wall 102a of the casing 102. A space C is provided to the left side of the chassis 100, for accommodating not shown gear trains or motors.

Figure 4:
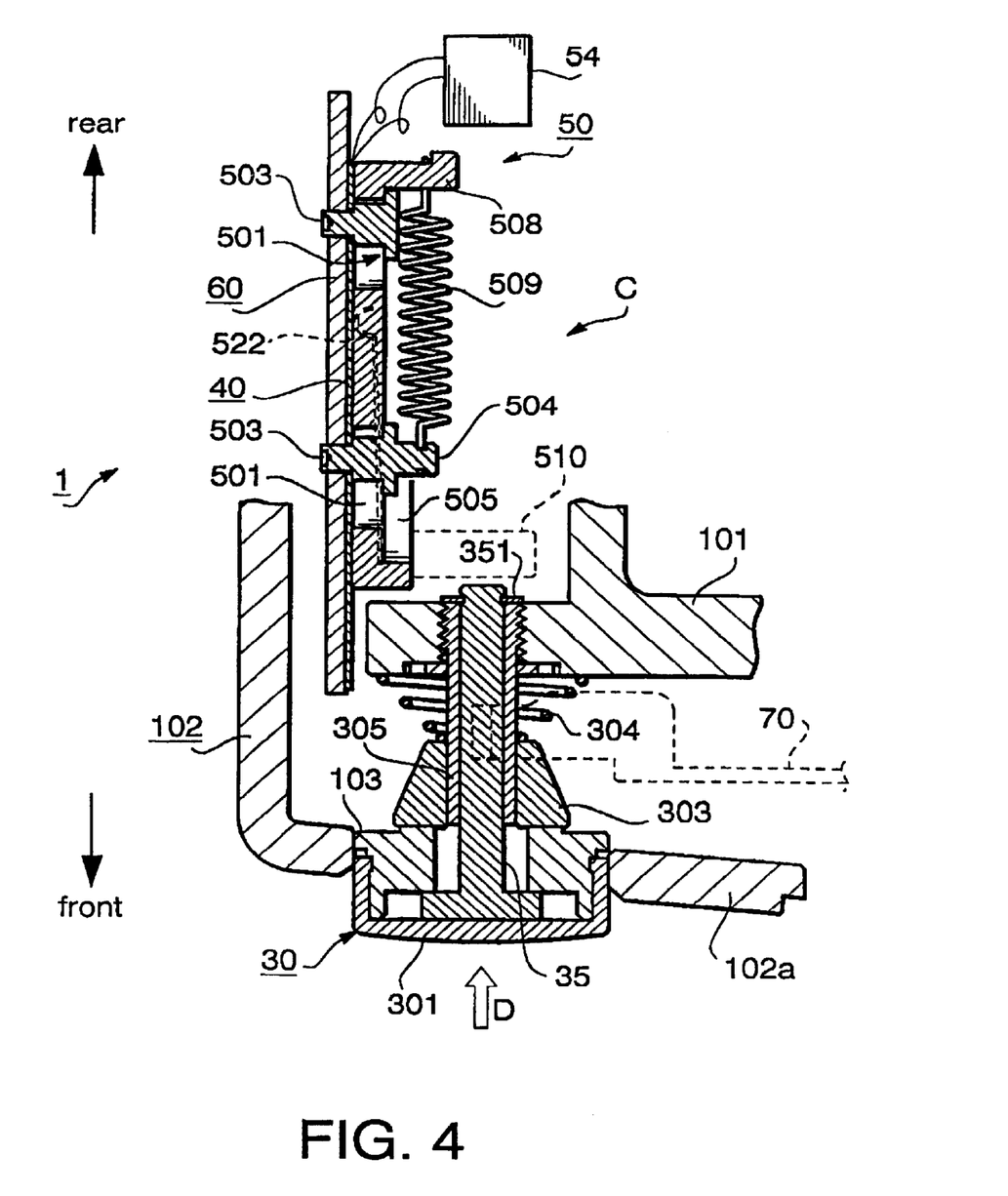
FIG. 4 is a sectional view of a sensor unit, a button and a lock mechanism of the camera of FIG. 1.

FIG. 4 is a sectional view of the lock mechanism, the button and a sensor unit, taken along line IV—IV of FIG. 1. The button 30 includes a head 301 provided in a opening 103 formed on the front wall 102a of the casing 102. An actuating rod 35 is provided to transmit the movement of the button 30 to the lock mechanism 70 as well as a sensor unit 1 (described below). One end of the actuating rod 35 is fixed to the head 301 of the button 30, so that the actuating rod 35 is moved along with the button 35. A tunnel tube 305 is provided to the front panel 101, which penetrates the front panel 101 in the direction D. The actuating rod 35 is supported in the tunnel tube 305, so that the actuating rod 35 slides in the direction D. The actuating rod 35 penetrates the front panel 101 (via the tunnel tube 305), so that the rear end thereof is protruded in the space C. For converting the linear movement of the actuating rod 35 to the swinging of the lock lever 70, a trapezoid member 303 is disposed between the head 301 and front panel 101 of the chassis 100. Further, a coil spring 304 is disposed between the trapezoid member 303 and the front panel 101, to bias the actuating rod 35 in the opposite direction (in the reverse direction with respect to the direction D).

With such an arrangement, when the user presses the button 30, the actuating rod 35 (and the trapezoid member 303) is moved in the direction D. When the user releases the button 35, the actuating rod 35 is moved back (by the force of the coil spring 304) so that the head 301 is again externally protruded from the front wall 102a of the casing 102. The actuating rod 35 is provided with a stopper 351 at the rear end thereof, which prevents the actuating rod 35 from dropping out of the tunnel 305 when the button 30 is not pressed.

Figure 5:
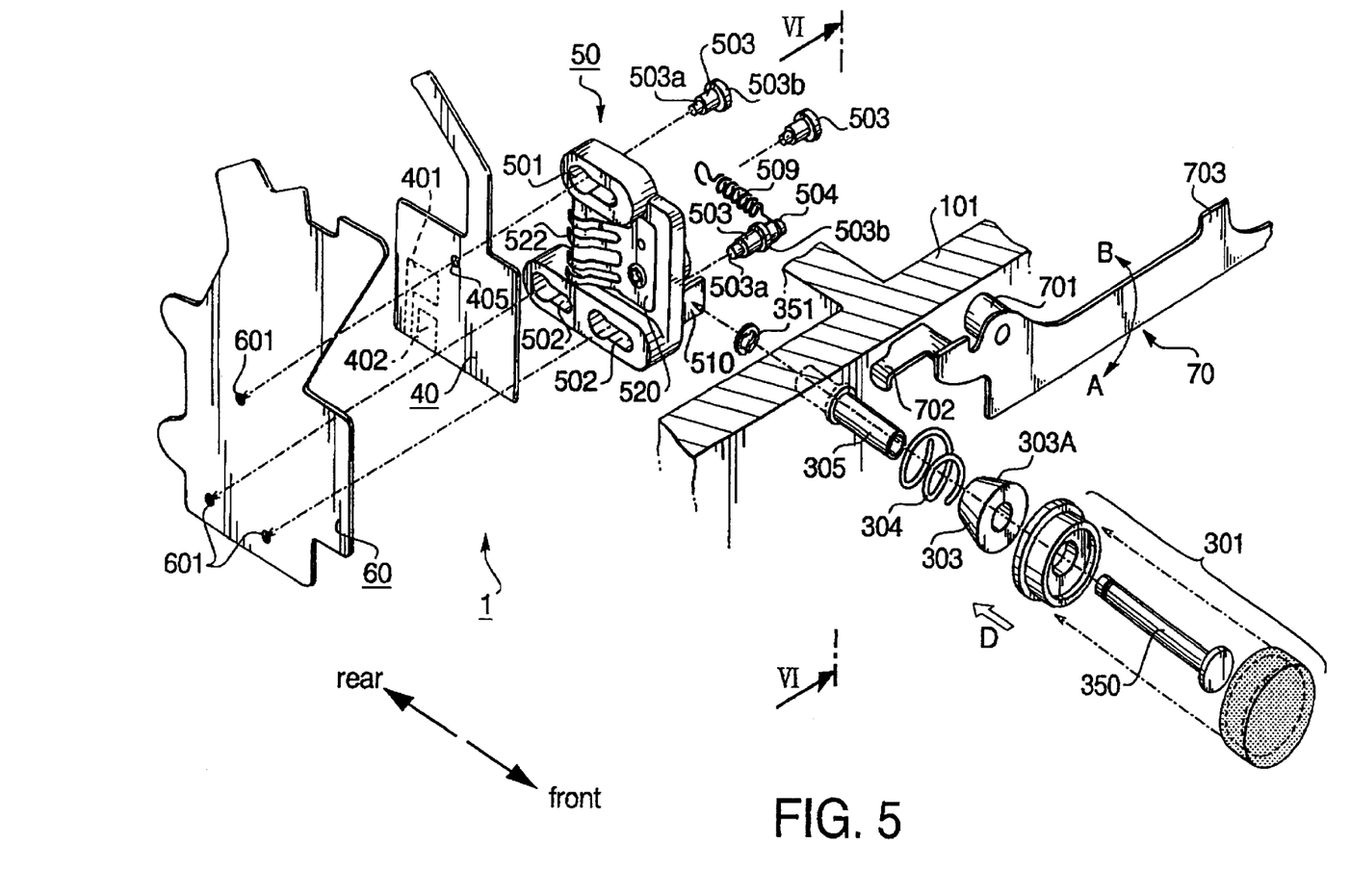
FIG. 5 is an exploded perspective view of the sensor unit, the button and the lock mechanism of FIG. 4.
Figure 6:
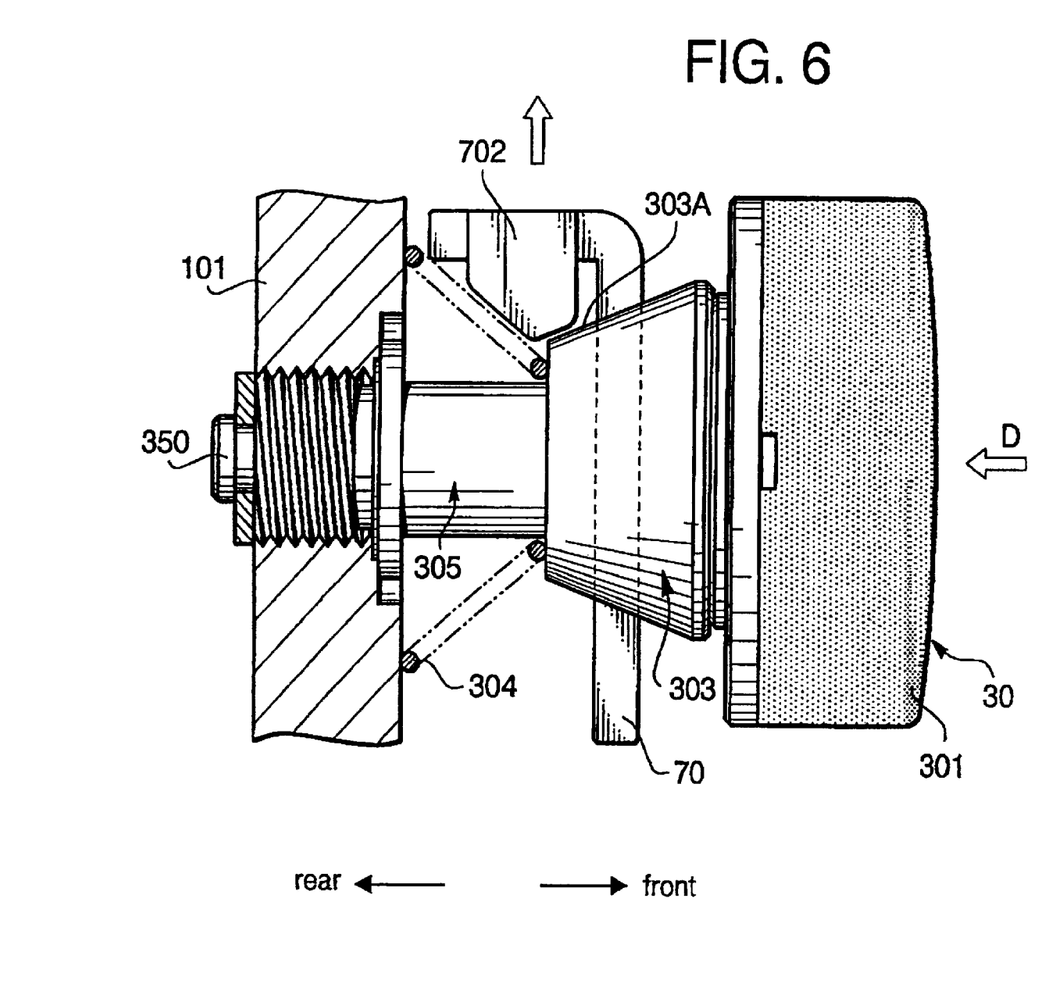
FIG. 6 is a side view of the button.

FIG. 5 is an exploded perspective view showing the lock lever 70 and the button 30, as well as a sensor unit 1. FIG. 6 is a sectional view of the lock lever 70 and the button 30 of FIG. 5, taken along line VI—VI of FIG. 5. As shown in FIG. 5, the lock lever 70 is swingably supported by a shaft 701 planted on the front panel 101 of the chassis 100 so that the lock lever 70 is swingable clockwise and counterclockwise in a plane parallel to the front panel 101. The lock lever 70 is provided with an abutting member 702 which abuts an inclined wall 303A of the trapezoid member 303. Thus, when the user presses the button 30, the trapezoid member 303 (moved in the direction D) urges the abutting member 702 upward as shown in FIG. 6. With this, the lock lever 70 is swung clockwise as shown in arrow A. As shown in FIG. 2, when the lock lever 70 rotates clockwise (shown by arrow A), the engaging member 703 of the lock lever 70 downwardly moved away from the lens unit 20.

With such an arrangement, while the button 30 is pressed, the lever 70 releases the lock of the lens unit 20, enabling the user to remove the lens unit 20 from the lens mount 80.

The arrangement for detecting whether the lens unit 20 is locked or not is described. As shown in FIG. 4, the sensor unit 1 is disposed in the space C formed at the left side of the chassis 100 (FIG. 3). As shown in FIG. 5, the sensor unit 1 includes a support plate 60 provided at the left end of the chassis 100 (FIG. 3). A slider 50 is mounted to the support plate 60, with a circuit board 40 sandwiched between the support plate 60 and the slider 50. The slider 50 is provided with a top guide groove 501 provided at the top thereof and two bottom guide grooves 502 provided at the bottom thereof. The guide grooves 501 and 502 are extending in parallel to the direction D.

Three pins 503 are used to mount the slider 50 to the support plate 60. Each pin 503 has a fitting portion 503a at one end thereof and a flange portion 503b at the other end thereof. The fitting portions 503a of the pins 503 are screwed respectively into screw holes 601 formed on the support plate 60, one of the fitting portion 503a penetrating a through-hole 405 formed on the circuit board 40. In this state, pins 503 respectively engage the guide grooves 501 and 502, holding the slider 50 between the flange portions 503b and the support plate 60. Due to the engagement of the pins 503 and the guide grooves 501 and 502, the slider 60 is slidable in the direction D. With this, the slider 50 and the circuit board 40 are mounted on the support plate 60 so that the slider 50 is slidable in the direction D.

The slider 50 is provided with a plate member 510 which is to be pushed by the rear end of the actuating rod 35. When the user presses the button 30, the plate member 510 is pushed by the actuating rod 35 so that the slider 35 slides in the direction D to reach its rear-most position. A coil spring 509 is provided in a recess 505 (FIG. 4) formed on the slider 50, for biasing the slider 50 to the opposite direction. One end of the coil spring 509 is fixed to a hook 508 (FIG. 4) formed on the rear end of the slider 50, the other end being fixed to one of the pin 503. When user releases the button 30, the slider 35 slides back by the force of the spring 509 so that slider 35 reaches its front-most position as shown in FIG. 4.

Figure 7:
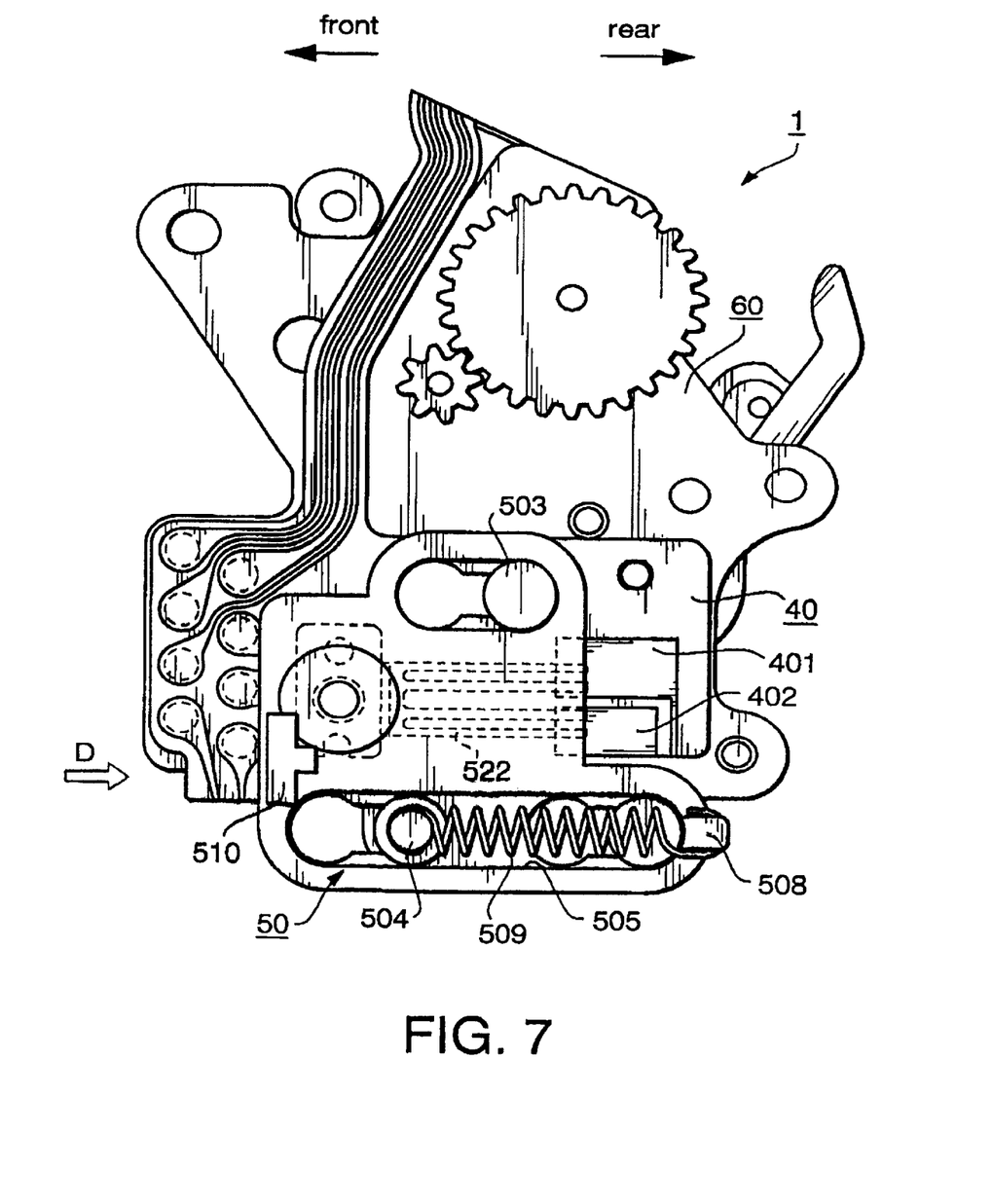
FIG. 7 is a side view of the sensor unit of the camera of FIG. 1.
Figure 8:
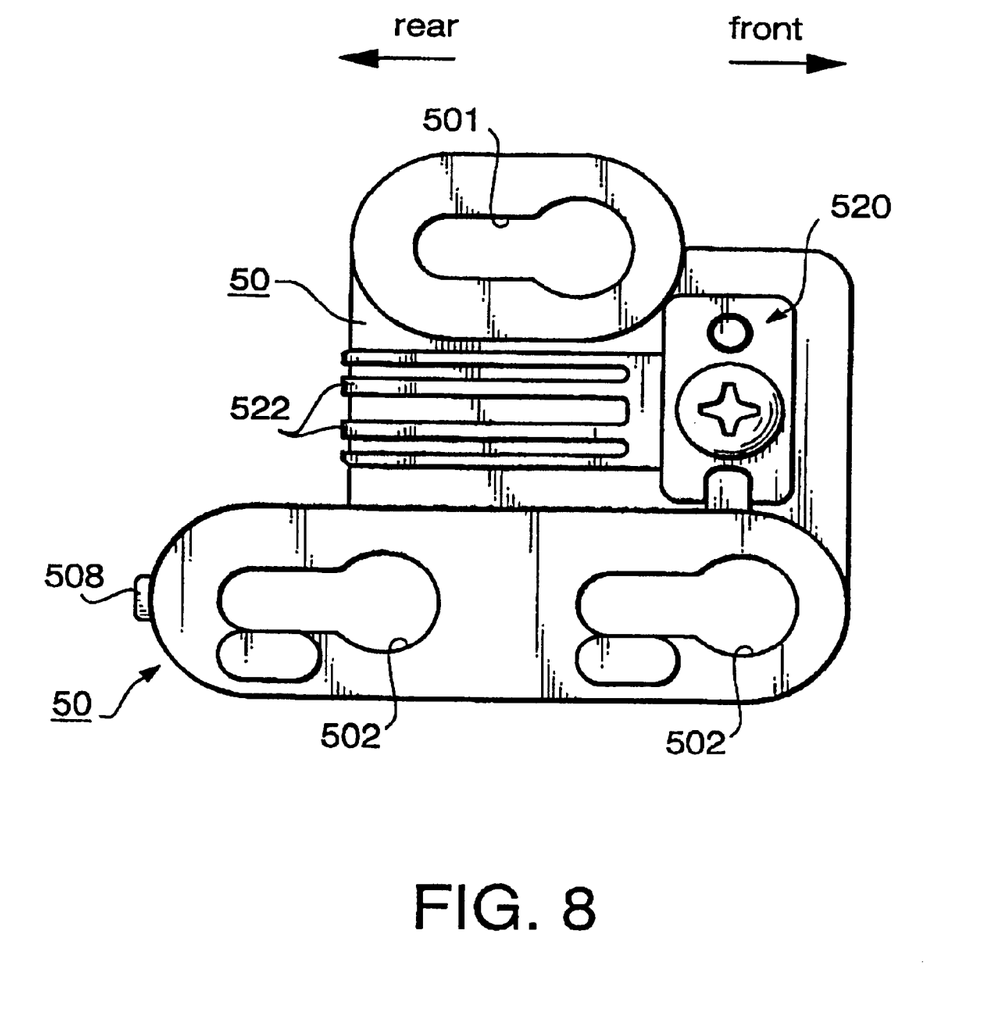
FIG. 8 is a side view of a slider of the sensor unit of FIG. 7.

FIGS. 7 and 8 are side views of the sensor unit and the slider, respectively. As shown in FIGS. 5, 7 and 8, a contact member 520 is provided between the top guide groove 501 and the bottom guide grooves 502 of the slider 50. The contact member 520 includes four belt-shaped contact plates 522 which are faced with two terminals 401 and 402 formed on the circuit board 40. The terminals 401 and 402 are not electrically connected with each other on the circuit board 40. When the user presses the button 30 (that is, when the slider 50 is at the rear-most position), the contact plates 522 moved in contact with the terminal 401 and 402, which electrically connects the terminals 401 and 402 as shown in FIG. 7. When the user releases the button 30 (that is, when the slider 50 is at the front-most position), the contact plates 522 do not contact with the terminals 401 and 402. That is, the terminals 401 and 402 are not electrically connected with each other. The controller 54 (FIG. 4) is connected to both terminals 401 and 402 separately via not shown wires and is arranged to recognize whether the button 30 is pressed or not, by detecting that the terminals 401 and 402 are electrically connected or not. That is, the slider 50 (provided with the contact plates 522) and the circuit board 40 (having terminals 401 and 402) constitute an electrical switch.

As constructed above, while the user presses the button 30 to remove the lens unit 20, the actuating rod 35 actuates the slider 50 as well as the lock lever 70. When the controller 54 detects that the button 30 is pressed (by detecting the electrical connection of the terminal 401 and 402), the controller 54 stops the power supply to the lens unit 20. Thus, when the user rotates the lens unit 20 to remove the lens unit 20 from the lens mount 80 while pressing the button 30, and when the connector pins 91 for power supply contact with the receptacles (not shown) of the lens unit 20 for signal transmission, it is prevented that power is unintentionally supplied to a circuit in the lens unit 20. That is, damage to the circuit is prevented.

Since the sensor unit 1 is disposed in the space C behind the front panel 101 of the chassis 100, it is prevented that the sensor unit 1 get wet, even if water penetrates into the casing 102 of the camera 10 (through a gap around the button). Thus, it is prevented that electrical parts (the terminals 401 and 402 and the contact member 520) of the sensor unit get rusty to cause a faulty continuity.

Although the structure and operation of a camera thereof is described herein with respect to the preferred embodiment, many modifications and changes can be made without departing from the spirit and scope of the invention.

The present disclosure relates to subject matter contained in Japanese Patent Application No. HEI 09-26121 filed on Jan. 24, 1997 which is expressly incorporated herein by reference in its entirety.

What is claimed is:

1. A camera having a lens mount for mounting an interchangeable lens unit:
   a casing;
   a chassis provided in the interior of said casing;
   a button provided to said casing;
   a lock mechanism actuated in response to said button, which locks said lens unit in a state that said lens unit is mounted to said lens mount;
   a sensor unit which detects whether said lock mechanism locks said lens unit or not, said sensor unit being disposed in a space provided to said chassis; and
   an actuator moved in response to the movement of said button that actuates said lock mechanism, said actuator penetrating a panel of said chassis so that said actuator can actuate said sensor unit.

2. The camera according to claim 1, wherein said panel being located between said sensor unit and said button.

3. The camera according to claim 2, wherein said casing includes a front wall on which said button is provided, said front wall and said panel being in parallel with each other.

4. The camera according to claim 1, wherein said lock mechanism is actuated by said actuator.

5. The camera according to claim 4, further comprising:
   a controller;
   first connector pins provided to said lens mount for transmitting signal between said controller and said lens unit; and
   second connector pins provided to said lens mount for supplying power to said lens unit,
   wherein said controller turns off a power supply to said second connector pins when said sensor unit detects that said lock mechanism releases said lens unit.

6. The camera according to claim 5, said sensor unit comprising a support member and a slider, wherein said slider is moved with respect to said support member in response to the movement of said button.

7. The camera according to claim 6, wherein said support member and said slider constitute an electrical switch, and said electrical switch is switched by the movement of said slider.

8. The camera according to claim 7, wherein said support member is provided with a board with two terminals and said slider is provided with a contact member, and
   wherein said two terminals are electrically connected with each other when said contact member moves in contact with said two terminals.

9. The camera according to claim 6, wherein said slider is provided with an abutting member to which said actuator abuts when said button is pushed.

10. The camera according to claim 9, wherein said actuator comprises a rod member with an end thereof fixed to said button, while the other end thereof abuts said slider when said button is pressed.

11. The camera according to claim 1, said lock mechanism comprising a swingable lever, said swingable lever engaging said lens unit when said swingable lever swings in a first direction, said swingable lever moving away from said lens unit when said swingable lever swings in a second direction.

12. The camera according to claim 11, said actuator further comprising an urging member, wherein said urging member urges said swingable lever in said second direction when said button is pressed.

13. A camera having a lens mount for mounting an interchangeable lens unit:
   a casing having a front wall;
   a chassis provided in said casing, said chassis including a front panel, said front panel and said front wall being in parallel with each other;
   a button provided to said front wall;
   a lock mechanism actuated in response to said button, which locks said lens unit in a state that said lens unit is mounted to said lens mount;
   an actuator moved in response to the movement of said button that actuates said lock mechanism, said actuator penetrating said front panel of said chassis; and a sensor unit which detects whether said lock mechanism locks said lens unit or not, said sensor unit being actuated by said actuator, wherein said sensor unit being disposed in such a manner that said front panel being located between said sensor unit and said button.

14. The camera according to claim 13, wherein said lock mechanism is actuated by said actuator.

15. The camera according to claim 13, said sensor unit comprising a support member and a slider, wherein said slider is moved with respect to said support member, following the movement of said button.

16. The camera according to claim 15, wherein said support member and said slider constitute an electrical switch, said electrical switch is switched by the movement of said slider.

17. The camera according to claim 13, wherein said actuator comprises a rod member with an end thereof fixed to said button, while the other end thereof abuts said slidable member when said button is pressed.

18. The camera according to claim 13, said lock mechanism comprising a swingable lever, said swingable lever engaging said lens unit when said swingable lever swung in a first direction, said swingable lever moving out of said engaging with said lens unit when said swingable lever swung in a second direction.

19. The camera according to claim 18, said actuator further comprising an urging member, wherein said urging member urges said swingable lever in said second direction when said button is pressed.

* * * * *